US012777453B2

(12) United States Patent
Freda et al.

(10) Patent No.: US 12,777,453 B2
(45) Date of Patent: Oct. 27, 2026

(54) METHODS FOR SYNCHRONIZING COMMON AIoT PROCEDURES AMONG MULTIPLE READERS

(71) Applicant: InterDigital Patent Holdings, Inc., Wilmington, DE (US)

(72) Inventors: Martino Freda, Laval (CA); Erdem Bala, East Meadow, NY (US); Paul Marinier, Brossard (CA); Jongwoo Hong, New York, NY (US); Brian Martin, Farnham (GB); Remun Koirala, London (GB); Ahmed Mostafa, Ottawa (CA); Aata El Hamss, Laval (CA); Patrick Tooher, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 154 days.

(21) Appl. No.: 18/794,709

(22) Filed: Aug. 5, 2024

(65) Prior Publication Data

US 2026/0040259 A1 Feb. 5, 2026

(51) Int. Cl.

| | |
|---|---|
| ***H04W 64/00*** | (2009.01) |
| ***H04B 17/318*** | (2015.01) |
| ***H04W 76/20*** | (2018.01) |

(52) U.S. Cl.

CPC .......... *H04W 64/00* (2013.01); *H04B 17/318* (2015.01); *H04W 76/20* (2018.02)

(58) Field of Classification Search

CPC . H04W 64/00; H04W 76/20; H04W 74/0833; H04W 84/18; H04W 68/02; H04B 17/318

See application file for complete search history.

(56) References Cited

U.S. PATENT DOCUMENTS

| | | | | |
|---|---|---|---|---|
| 2024/0334207 | A1* | 10/2024 | Lee | H04W 4/38 |
| 2025/0351199 | A1* | 11/2025 | Ali | H04W 74/006 |
| 2025/0374096 | A1* | 12/2025 | Huang | H04W 24/10 |

OTHER PUBLICATIONS

Gs1, EPC Radio-Frequency Identity Protocols Generation-2 UHF RFID; Specification for RFID Air Interface; Protocol for Communications at 860 MHz-960 MHz, Version 2.0.1 Ratified (2015).

(Continued)

*Primary Examiner* — Fred A Casca

(74) *Attorney, Agent, or Firm* — Volpe Koenig

(57) ABSTRACT

A wireless transmit/receive unit (WTRU) may be configured to receive, from one or more responding ambient internet of things (AIOT) devices, an AIOT message and to report a device identity and data from the AIOT message of the one or more responding AIOT devices that are in an associated device list. The associated device list indicates AIOT devices that are associated with the WTRU. The WTRU may be configured to report additional information that includes information of a non-associated AIOT device, which is a responding AIOT device that is not in the associated device list. The additional information may be reported based on a change in a location of the WTRU or a quality of a transmission of the responding non-associated AIOT device. The additional information may comprise a device identity of the responding non-associated AIOT device and a signal strength measurement of the responding non-associated AIOT device.

20 Claims, 12 Drawing Sheets

(56) References Cited

OTHER PUBLICATIONS

Huawei, "New SID: Study on solutions for Ambient IoT (Internet of Things) in NR," 3GPP TSG RAN Meeting #102, RP-234058, Edinburgh, UK (Dec. 11-15, 2023).
Intel Corporation, "Discussions on frame structure and timing aspects for A-IoT," 3GPP TSG RAN WG1 #116- bis, R1-2402134, Changsha, China (Apr. 15-19, 2024).
Lenovo, "Discussion on random access for Ambient IoT," 3GPP TSG-RAN WG2 Meeting #125bis, R2-2402727, Changsha, China (Apr. 15-19, 2024).
Nokia, "Further on AloT random access" 3GPP TSG-RAN WG2 Meeting #126, R2-2405107, Fukuoka, Japan (May 20-25, 2024).
Samsung, "Initial considerations on the paging for AIoT," 3GPP TSG-RAN WG2 Meeting #125bis, R2-2403506, Changsha, China (Apr. 15-19, 2024).

* cited by examiner

METHODS FOR SYNCHRONIZING COMMON AIoT PROCEDURES AMONG MULTIPLE READERS

BACKGROUND

A study item on Ambient Internet of Things (AIoT) was agreed in 3GPP Release 19. Justification for this study item has come from an increased popularity of IoT. In recent years, IoT has attracted much attention in wireless communication. More 'things' are expected to be interconnected for improving productivity, efficiency, and increasing comforts of life. Further, reduction of size, complexity, and power consumption of IoT devices may enable the deployment of tens or even hundreds of billion IoT devices for various applications and provide added value across the entire value chain. It is impossible to power all the IoT devices by battery that needs to be replaced or recharged manually, which leads to high maintenance cost, serious environmental issues, and even safety hazards for some use cases (e.g., wireless sensor in electric power and petroleum industry).

Considering the limited size and complexity required by practical applications for batteryless devices with no energy storage capability or devices with limited energy storage that do not need to be replaced or recharged manually, the output power of an energy harvester is typically from 1 μW to a few hundreds of μW. Existing cellular devices may not work well with energy harvesting due to their peak power consumption of higher than 10 mW.

SUMMARY

A wireless transmit/receive unit (WTRU) may be configured to receive, from one or more responding ambient internet of things (AIOT) devices, an AIOT message. The WTRU may be configured to report, to a network node, a device identity and data from the AIOT message of the one or more responding AIOT devices that are in an associated device list. The associated device list indicates AIOT devices that are associated with the WTRU. The WTRU may be configured to report, to the network node, additional information that includes information of a non-associated AIOT device. A non-associated AIOT device is a responding AIOT device that is not in the associated device list. The additional information may be reported based on a change in a location of the WTRU or a quality of a transmission of the responding non-associated AIOT device. The additional information may comprise a device identity of the responding non-associated AIOT device and a signal strength measurement of the responding non-associated AIOT device. The additional information may be reported on a condition that a WTRU location has changed by a predetermined amount or based on a mobility condition. The mobility condition is may be at least one of: a different cell, a different tracking area, or a different GPS location. The additional information may be reported on a condition that a signal strength of the responding non-associated AIOT device has changed by a threshold amount since a last message was received from the responding AIOT non-associated device. The reporting a device identity and data of the one or more responding AIOT devices that are in an associated device list may be based on a reporting trigger. The reporting trigger may be at least one of: a measurement of a quality of a responding AIOT device transmission; a measurement of a specific resource; a measurement of a number of responding AIOT devices; a measurement of a number of operations; a measurement of a number of resources; a measurement of time; or a measurement of a time difference. The WTRU may be configured to receive reporting configuration information. The associated device list may be received from a gNB. The WTRU may be a reader.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
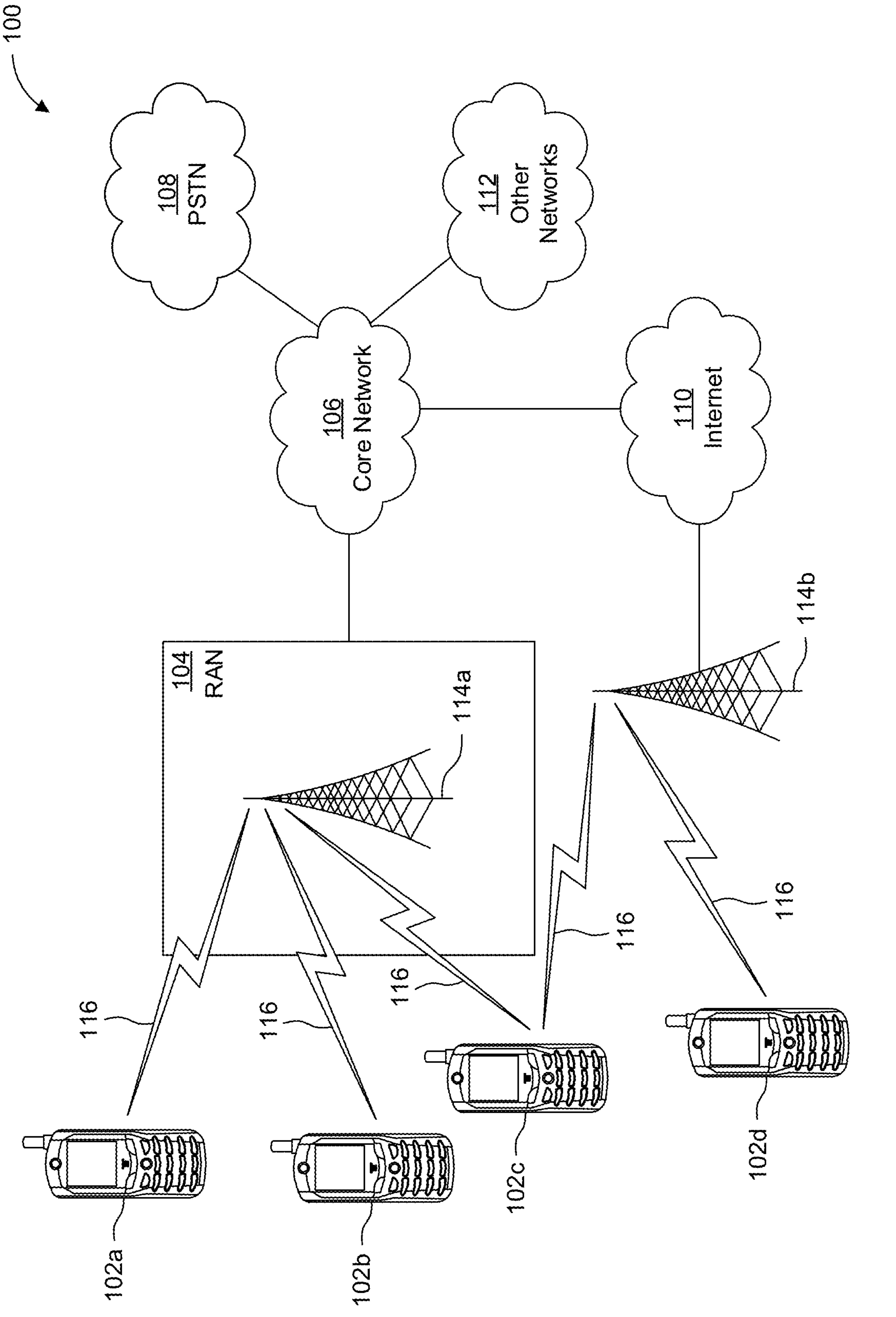
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
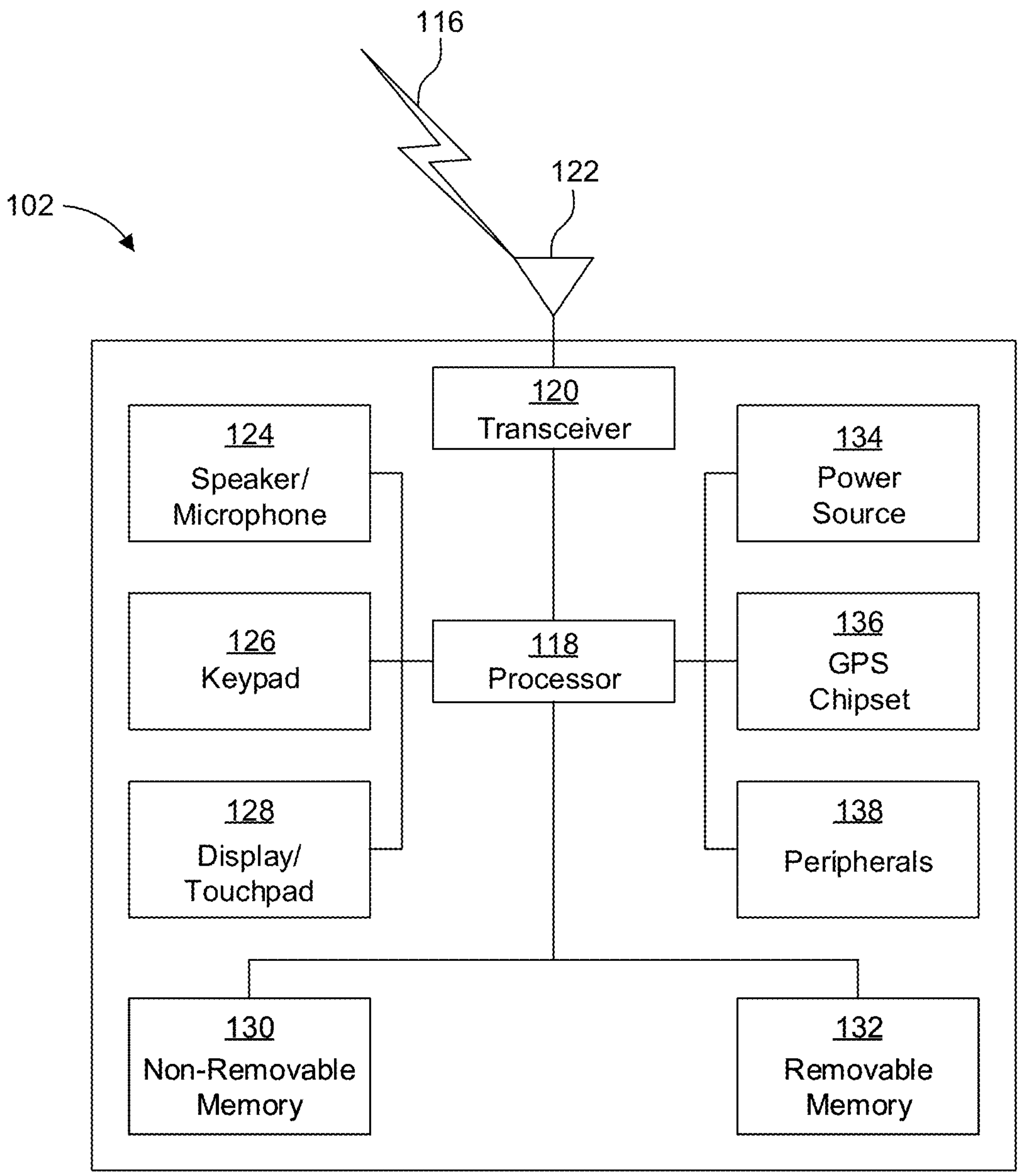
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
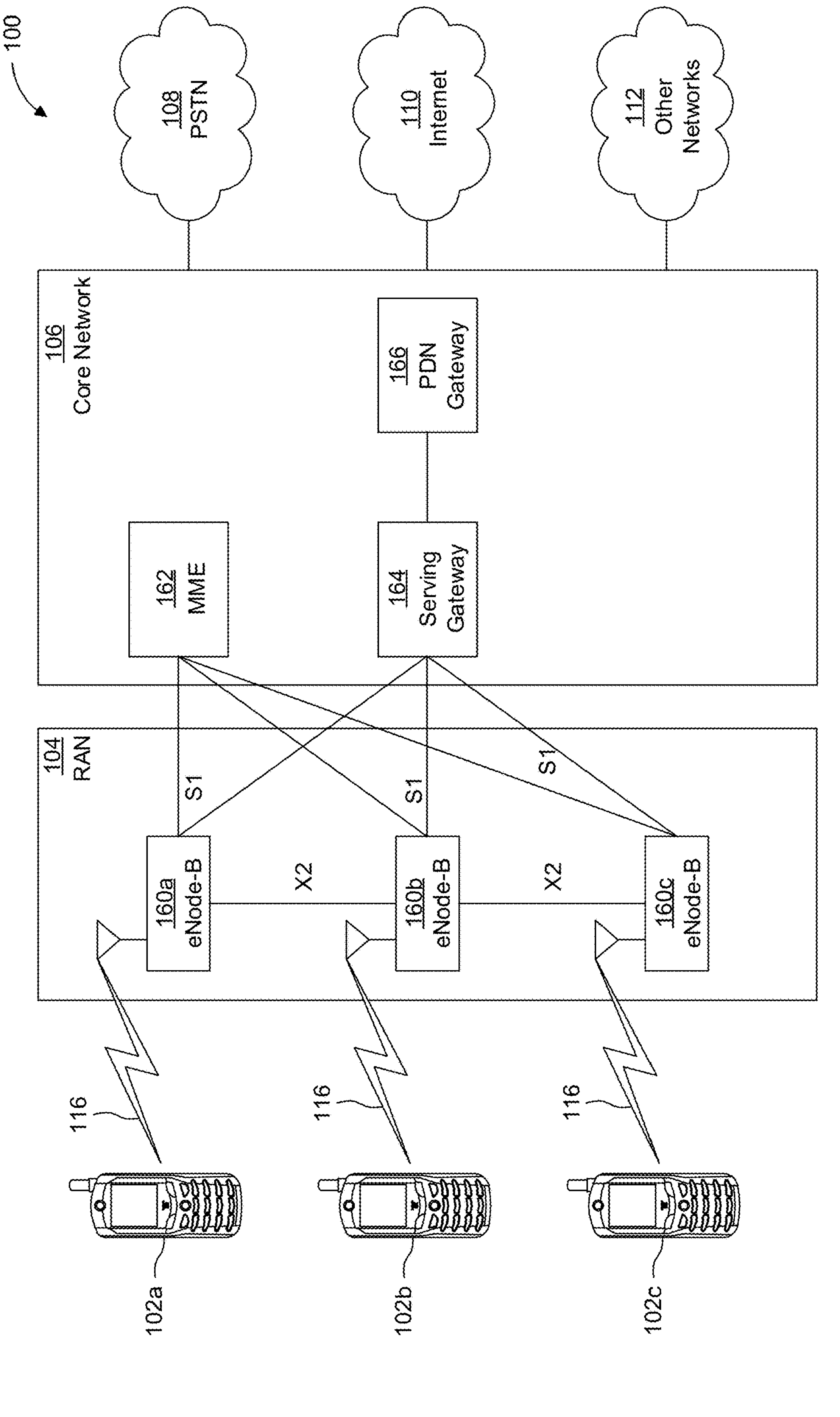
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ, and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
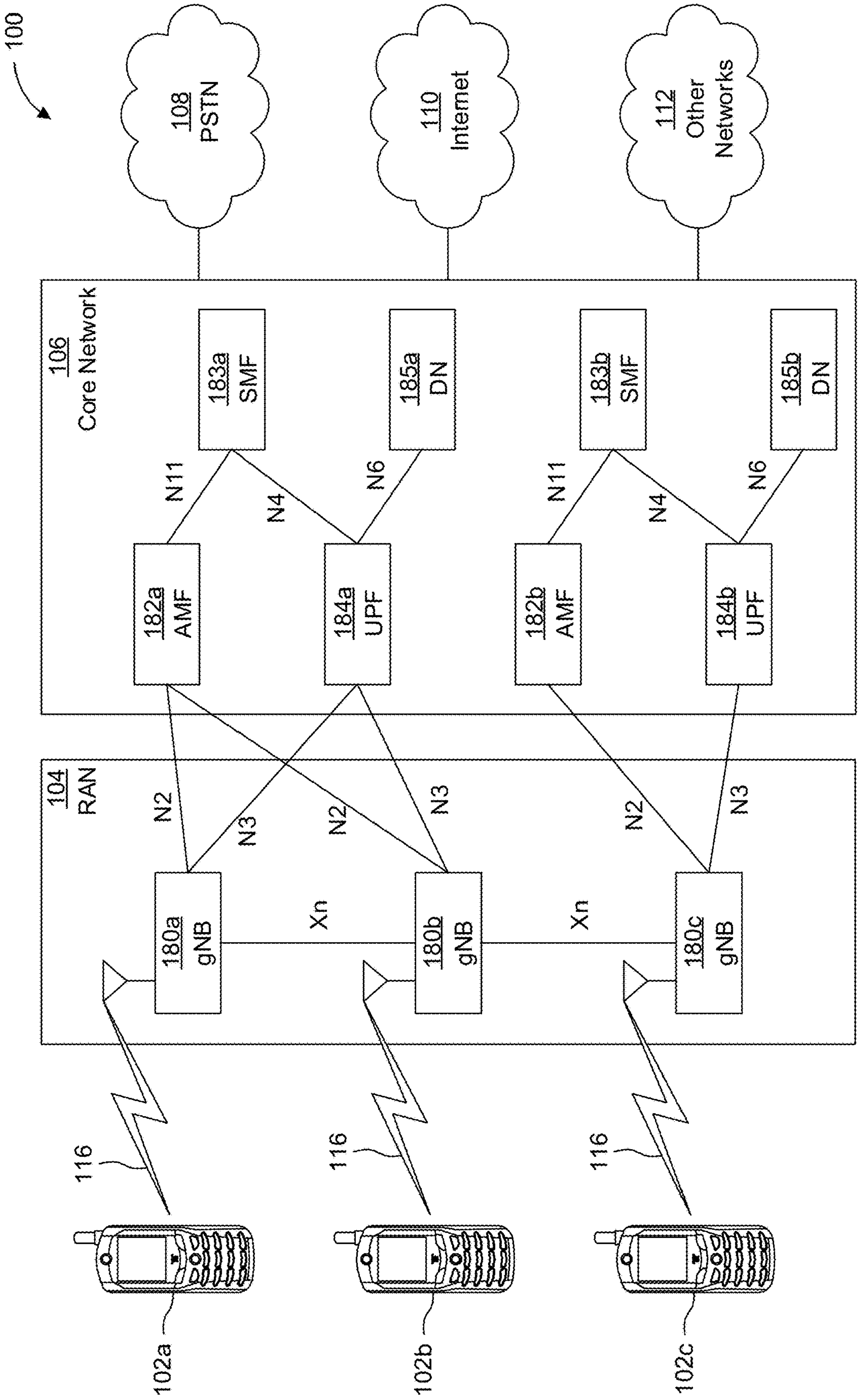
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
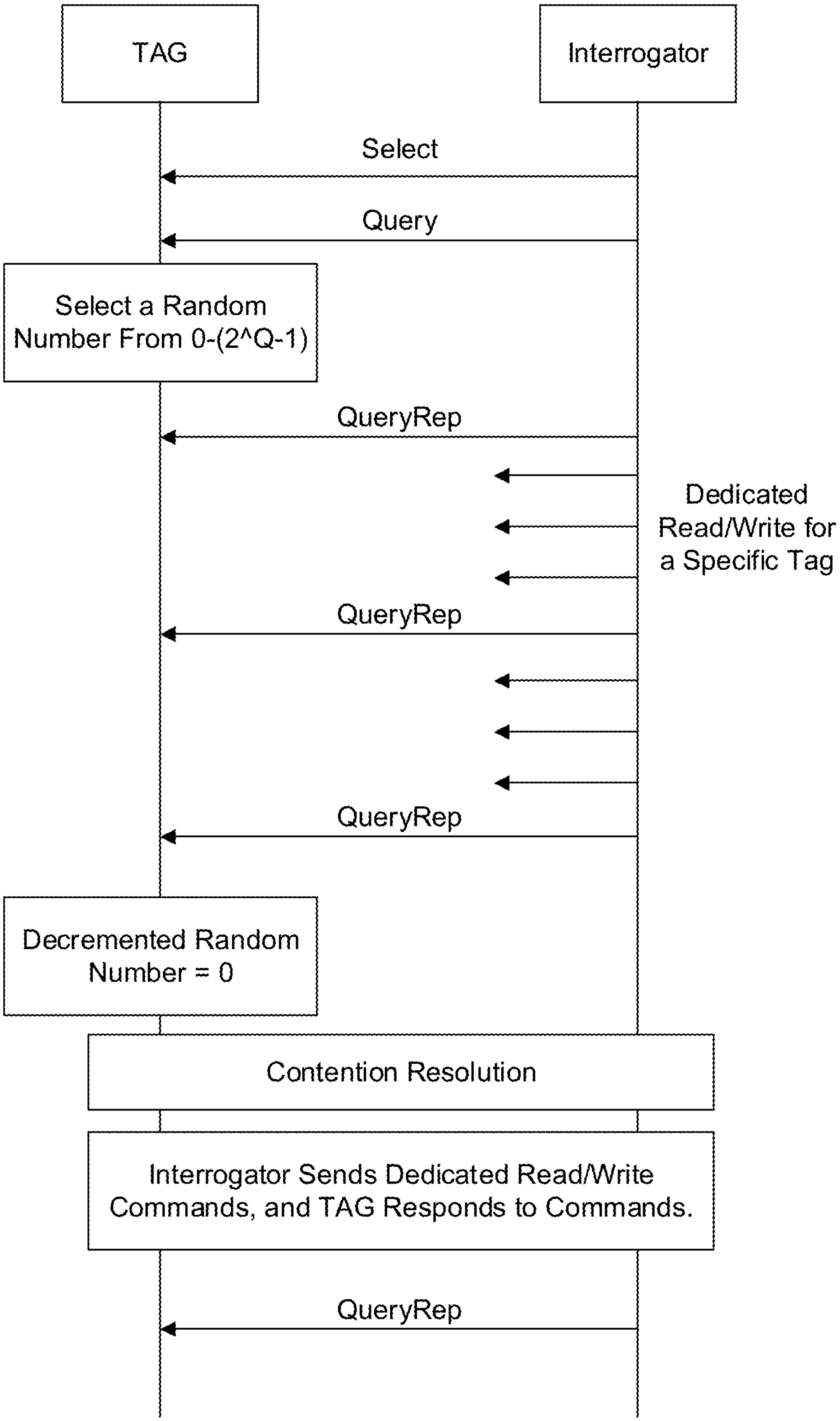
FIG. 2 shows an example RFID inventory procedure.

Radio Frequency Identification (RFID) is used currently for applications of asset identification. An example RFID inventory procedure is shown in FIG. 2. In the inventory procedure, an interrogator sends a Query message to energize all or a subset of TAGs. Following a Query message, a TAG selects a random number from 0-2^Q−1 and loads its memory with that number. At each transmission of a QueryRep, the TAG decrements its counter until the counter reaches 0. When the counter reaches 0, the TAG initiates a contention resolution procedure which comprises of transmitting its device ID in the uplink, and waiting for confirmation of the device ID in the downlink, to address a possible collision between multiple devices selecting the same random number. For a device that has passed contention resolution, the interrogator may send multiple read/write commands, to which the TAG may respond.

Figure 3:
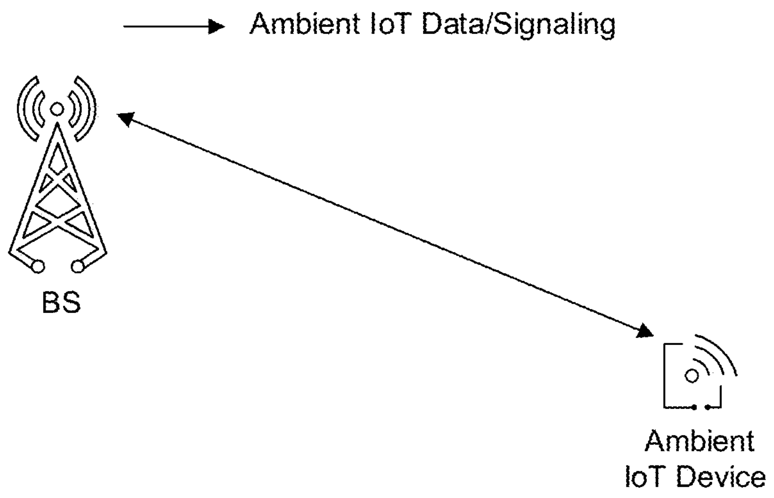
FIG. 3 shows an example AIOT topology.

FIG. 3 shows an example AIOT topology (e.g. Topology 1). In Topology 1, an Ambient IoT device directly and bidirectionally communicates with a base station (BS) (e.g. gNB). The communication between the base station and the ambient IoT device includes Ambient IoT data and/or signaling. This topology includes the possibility that the base station transmitting to the Ambient IoT device is different from a base station receiving from the Ambient IoT device.

Figure 4:
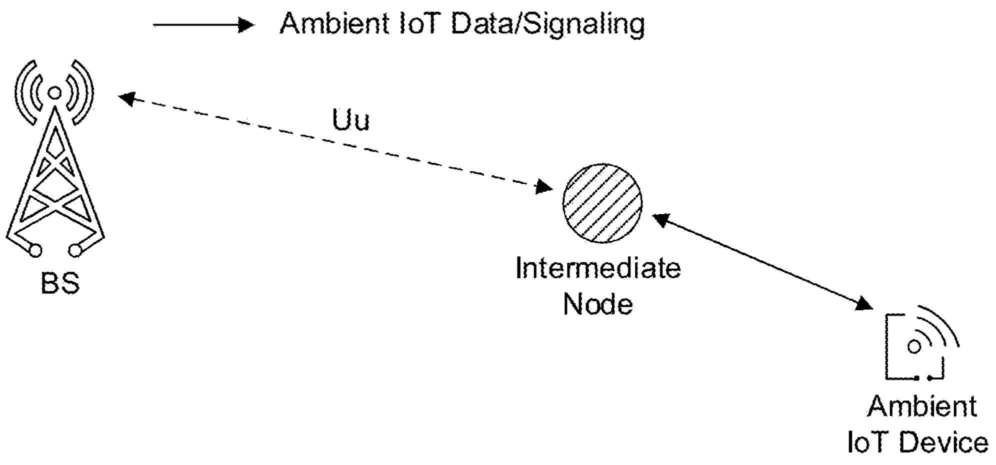
FIG. 4 shows an example AIOT topology using an intermediate node.

FIG. 4 shows an example AIOT topology using an intermediate node (e.g. Topology 2). In Topology 2, the Ambient IoT device communicates bidirectionally with an intermediate node between the device and base station. In this topology, the intermediate node may be, for example, a relay, an IAB node, a WTRU, or a repeater. The intermediate node is capable of Ambient IoT communication. The intermediate node transfer information between the base station and the Ambient IoT device.

Figure 5:
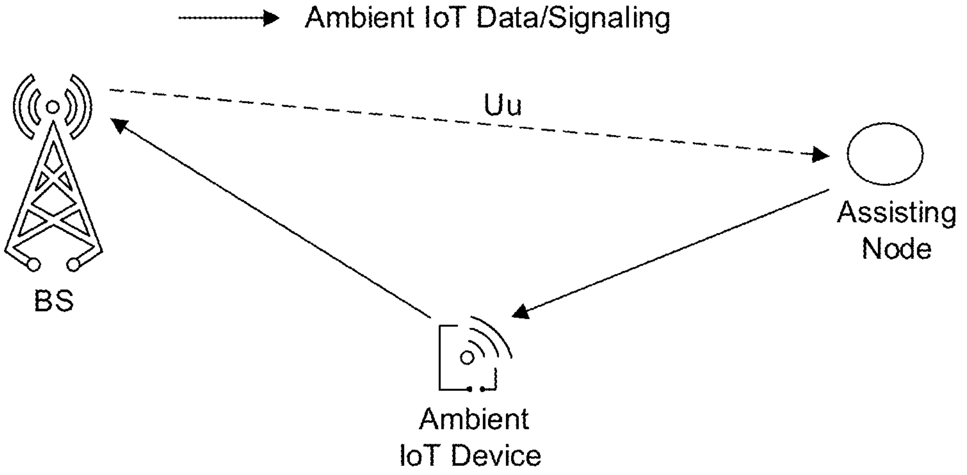
FIG. 5 shows an example AIOT topology using an assisting node with downlink assistance.

FIG. 5 shows an example AIOT topology using an assisting node with downlink assistance (e.g. Topology 3). In Topology 3, the Ambient IoT device transmits data/signaling to a base station, and receives data/signaling from an assisting node. The base station and the assisting node communicate over a Uu interface. In this topology, the assisting node may be, for example, a relay, an IAB, a WTRU, or a repeater. The assisting node is capable of ambient IoT communication.

Figure 6:
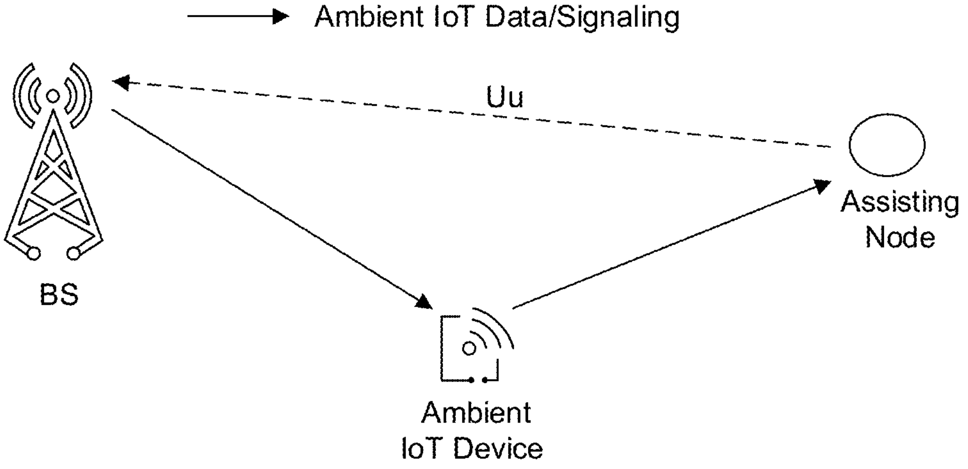
FIG. 6 shows an example AIOT topology using an assisting node with uplink assistance.

FIG. 6 shows an example AIOT topology using an assisting node with uplink assistance (e.g. Topology 4). The Ambient IoT device receives data/signaling from a base station and transmits data/signaling to the assisting node. The base station and the assisting node communicate over a Uu interface. In this topology, the assisting node may be, for example, a relay, an IAB, a WTRU, or a repeater. The assisting node is capable of ambient IoT communication.

Figure 7:
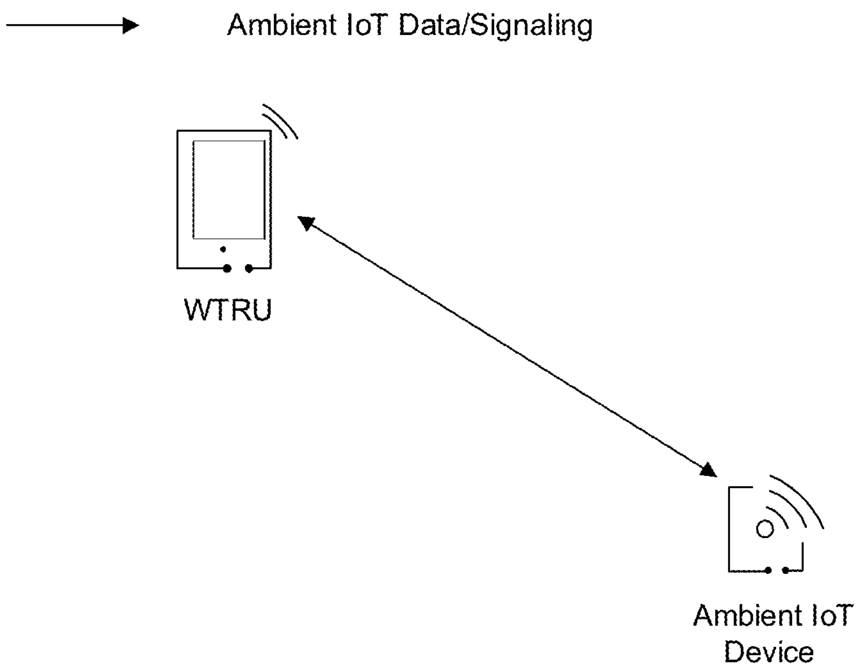
FIG. 7 shows an example AIOT topology.

FIG. 7 shows an example AIOT topology (e.g. Topology 5). In Topology 5, the Ambient IoT device communicates bidirectionally with a WTRU. The communication between the WTRU and the ambient IoT device includes Ambient IoT data and/or signaling.

In topology 2, an AIOT application in the network (e.g. AMF) may make use of one or more readers to perform AIOT operations. Each reader function may be located within a WTRU. Each AIOT operation may be targeted towards one or more AIOT devices. For example, an inventory procedure may be targeted towards devices corresponding to a set or range of device identities defined by an application layer. Similarly, an AIOT command (e.g., read, write, kill) may be targeted to a single, or finite number, of devices.

Depending on the architecture of topology 2 with the network, the gNB may not manage the AIOT procedure but may instead manage only the resources associated with the AIOT interface (e.g. a transmission/reception interface between a reader (e.g. a WTRU) and the AIOT device). Specifically, an application layer may be aware of a number of readers that are in range of a specific AIOT device, but may not have the awareness of which reader is best suited for communicating with the AIOT device. Maintaining this information at the application layer in the core network may not be feasible as the readers may move frequently and interaction with the core network should be limited to the AIOT transactions themselves. Initiating AIOT operations without such knowledge would require that multiple readers initiate the same procedure (e.g., AIOT command) and would result in inefficient resource usage on the AIOT interface. In addition, it would cause unnecessary power consumption at the AIOT device, since the AIOT device would need to respond to multiple procedures triggered by different readers unnecessarily. In addition to increasing device power consumption, this may also impact the correct functioning of a device (e.g., if a read command has some impact on subsequent behavior of the device after the read).

A more scalable approach would be for the RAN (e.g., gNB) to maintain the association of the reader to an appropriate device. To do so, the readers would need to interact with each other or with the gNB to share information that would ensure there are no redundant operations.

There is a need to determine how to avoid redundant AIOT operations (e.g., inventory, command) in a scenario where multiple WTRU readers are deployed in an area and the gNB does not directly manage the inventory procedure.

The terms device, AIOT WTRU, and TAG may be used interchangeably herein to mean an AIOT device that is being inventoried/queried by a reader.

The term reader may refer to an entity which queries an AIOT device, either directly, or via an intermediate WTRU, as in topology 2. The term reader in topology 2 may refer to an intermediate WTRU. The term reader may refer to a network node or a WTRU, depending on the context and/or the topology.

The terms reader, network, and intermediate WTRU, may be used interchangeably herein to mean a reader.

Inventory or inventory procedure may refer to an overall procedure of a reader triggering access by multiple devices using a sequence of messages (e.g., similar to query, followed by query rep in RFID). For example, the inventory procedure may refer to a single round of attempts to have each device respond or attempt to respond with its access ID, or perform a RACH procedure. For example, the inventory procedure may refer to a set of access occasions which may have zero or at least one device respond within an access occasion.

An inventory procedure may occur similar to an RFID procedure. Although referred to herein as inventory procedure, it may be termed differently in device requirements or specifications (e.g., query procedure, paging procedure, or the like).

Occasion may refer to an opportunity for a device transmission that may be delimited by a transmission of a query rep message, or similar. For example, a device may perform a transmission in an occasion by performing an AIOT transmission in a defined time following a query rep associated with that transmission. For example, an occasion may comprise of both a time aspect and a frequency aspect. For example, a device may determine an occasion as a transmission following a specific query rep, and by transmitting on one of a number of frequencies (e.g., FDM). A selection of an occasion may apply equivalently to selection of only a time component and/or selection of a frequency component.

A reference to time may be associated with an absolute time measurement (e.g., seconds, slots, or frames). A reference to time may refer to a number of executions of a procedure, for example triggered by a reader (e.g., number of inventory procedures, number of accesses or RACH procedures). A reference to time may refer to a number of messages, for example of a specific type, or comprising specific information, as described herein, received or transmitted.

Configuration or pre-configuration may refer to a configuration received by a message (e.g., a radio resource control (RRC) message, a medium access control (MAC) control element (CE), a physical (PHY) layer signal, a data PDU, a control PDU associated with any or a new protocol layer) received from a network node or from another device or WTRU.

A device herein may be configured by a reader, whereby the reader may be a network node or a WTRU (e.g., intermediate WTRU in topology 2). In the case of a WTRU, the WTRU may derive the device configuration itself, or receive the device configuration from the network, in which case, the device configuration may be relayed from the network to the device by the WTRU. A WTRU configuration (e.g. in the case of a WTRU in topology 2) may be received from a network node (e.g., a gNB).

A reader WTRU (WTRU) may report inventory and/or command results/data/ancillary information to the network. Such reports may be performed, for example, as part of a message (e.g. an RRC message) transmitted by the WTRU.

A WTRU may be configured with reporting characteristics. Herein, reporting characteristics may refer to any of, buy not necessarily limited to: Whether a WTRU transmits a report and/or the triggers/events/conditions which initiate a report, the information/contents to include in a report and/or whether or not to include a specific information, the time at which the report is transmitted; the frequency (e.g. how often) in which a report is transmitted, the message (e.g., RRC or MAC CE) to use to send the report, and the priority with which the report is sent.

A WTRU may determine a reporting characteristic based on one or more or a combination of the following. The WTRU may determine a reporting characteristic based on a network (NW) configuration (e.g. configuration information in a message received from the network.

The WTRU may determine a reporting characteristic based on a device to reader (D2R) message received by a reader. This may include which devices have transmitted (e.g., based on, for example, a device identity, a device class, or a device capability). This may include how many devices have transmitted. This may include the contents of the D2R message. This may include the measurements of the D2R messages (e.g., received reference signal received power (RSRP), received signal strength indicator (RSSI), or energy).

The WTRU may determine a reporting characteristic based on contents of a previous reader to device (D2R) message. This may include configuration information sent in a message (e.g. a paging message or a synchronization message).

The WTRU may determine a reporting characteristic based on a triggered or ongoing AIOT procedure at the WTRU. This may include whether the procedure is inventory only, inventory+command, or command only. This may include whether the random access is contention-based or contention free. This may include whether the random access is 2-step-like or 4-step-like.

The WTRU may determine a reporting characteristic based on a stage of execution of a triggered or ongoing AIOT procedure at the WTRU. This may include the number of AIOT occasions elapsed/remaining in an inventory procedure. This may include an amount of time since the transmission/reception of a message on the AIOT interface.

The WTRU may determine a reporting characteristic based on an RRC state of the WTRU.

The WTRU may determine a reporting characteristic based on identification (ID) (e.g., C-RNTI) of the WTRU.

The WTRU may determine a reporting characteristic based on a location, or change of location of the WTRU.

The WTRU may determine a reporting characteristic based on a Uu RRC procedure performed by the WTRU.

The WTRU may determine a reporting characteristic based on Uu traffic available for transmission at the WTRU.

A WTRU may determine whether to trigger a report to the network. In an embodiment, a WTRU may determine whether/when to trigger reporting of an inventory procedure. For example, a WTRU may be configured with measurement events associated with AIOT operations. Such events may trigger the WTRU to perform reporting to a gNB. Such triggers may be based on any or a combination of the following.

The triggers may be based on a configured period. For example, a WTRU may report periodically based on a configured period of time. For example, the WTRU may start a timer upon completion of a first report. When the timer expires, the WTRU may send a second report. For example, the WTRU may report periodically based on a number of AIOT operations (e.g., an inventory procedure or a random access procedure). For example, the WTRU may be configured to report particular (e.g. each X) inventory procedures. For example, the WTRU may report periodically based on a number of received/transmitted AIOT message (e.g. of a specific type). For example, the WTRU may report periodically each X transmission of a specific reader to device (R2D) message (e.g., paging message or sync/occasion message).

The triggers may be based on WTRU mobility. This may include conditional handover (CHO)/handover (HO) or reselection. For example, a WTRU may report the latest inventory results following a (e.g. each) HO or cell reselection. For example, the WTRU may report the results of an inventory procedure which occurs following a (e.g. each) HO or cell reselection. This may include a legacy area update procedure. For example, the WTRU may report the latest inventory results following a (e.g. each) RAN area update or tracking area update. For example, the WTRU may report the results of an inventory procedure which occurs following (e.g. immediately following) a RAN area update or tracking area update procedure. For example, the WTRU may be configured with a set of geolocation areas (e.g., zones). The WTRU may report the results of an inventory procedure following a (e.g. each) zone change or may report the results of an inventory procedure which occurs following (e.g. immediately following) a zone change. This may include conditions associated with speed, distance, or acceleration measured by the WTRU. For example, the WTRU may report the latest inventory results, for example with a specific periodicity, when the speed of the WTRU is above a configured threshold.

The triggers may be based on a procedure type. This may relate to the type of upper layer procedure that is triggered at the WTRU. For example, the WTRU may report the results of an inventory only procedure (e.g. only random access triggered), but may not report the results of a command only procedure (e.g. random access triggering for the purpose of only sending command). This may relate to the type of random access. For example, the WTRU may report the results for a contention based situation but not for a contention free situation.

The triggers may be based on device identities reported by one or more devices during an inventory procedure. This message may be related to reporting one or more devices that may be configured as part of the reporting conditions. For example, the WTRU may trigger a report if a specific device or device ID is received (e.g., in MSG1, in MSG3, or in another message such as a command response). MSG1 and MSG3 are similar to the messages in a 4-step RACH, but are redefined as a new random access procedure for the AIOT interface. This message may include a list of device identities associated with a set of selected devices by the WTRU (e.g. as part of the device selection process at the WTRU). For example, the WTRU may report its current list of selected devices and/or a set of devices added/removed to its list if the list of its currently selected devices changes (e.g. by at least a specific (x) devices).

The triggers may be based on received messages from one or more devices during the inventory procedure. This may be related to the reception of a specific message type, the number of messages received of a specific type (e.g., number of command responses), or a control message (e.g., reception of status report by one or more devices or reception of an energy indication by one or more devices). For example, the WTRU may trigger a report if it receives an energy status message, or if the number of energy status messages is above a threshold. This may be related to the quantity carried in a specific message transmitted by a device. For example, if a device transmits an energy indication, or a delay indication (i.e., requesting to repeat the procedure after a certain time), the report may be triggered if the energy is below a threshold, or the time is above a threshold.

The triggers may be based on measurements from the device transmissions involved in an inventory procedure. This may comprise of triggering a report based on measurements of device transmissions, or quantities related to measurements of device transmissions.

A WTRU may include any of the following contents in the report to the network: carrier wave (CW) or a code identifying the carrier wave or the initiator of the carrier wave; identity received from one or more devices in MSG1; identity received from one or more devices in MSG3; contents of the message (e.g., MSG3) received from a device; measurements of the device transmissions, where such measurements may be any of those described herein; measurements of the energy in a resource, where such measurements may be any of those described herein; a number of devices which satisfy a condition/criteria, where the condition/criteria may be any of those described herein; a list of devices selected by the WTRU, or the identity of one or more devices added/removed from this list; set of resources (e.g., time/frequency resources) selected by a device to transmit.

A WTRU may be configured with measurement-based reporting triggers. A WTRU may be configured with reporting triggers which may be based on measurements of the received transmissions of the devices involved in an inventory and/or command procedure. For example, a WTRU may receive an event configuration (i.e., a set of parameters) which may be used to configure the evaluation of a criteria or quantity, for example with a comparison with a configured amount or threshold. The criteria evaluated for such events may comprise of any of the following.

The criteria evaluated may be a measurement of a quality of a device's transmission. The reader may evaluate a signal strength or signal power of a D2R transmission of one or more devices. This may comprise an RSSI measurement, a power spectral density (PSD) measurement, or a signal strength measurement of a preamble, of the entire transmission, of a backscattered carrier-wave. In the case of measurements of quality, the measured quantity to be evaluated may be a signal power of a specific device, averaged over an interval of time, over multiple inventory procedures, or over multiple message. The measurement may be made for a specific signal or message (e.g., MSG1 only, MSG3 only). In the case of measurements of quality, the measured quantity to be evaluated may be average signal power of a specific set of devices (e.g., where the devices may be configured by the network), average signal power of all devices responding to an particular inventory, or average signal power of a specific set of devices or all devices over an interval of time, over multiple inventory procedures, over multiple messages, or for a specific message. In the case of measurements of quality, the measured quantity to be evaluated may be a difference, or change in, signal power of one, all, or a set of devices between two or more inventory procedures (e.g. successive inventory procedures).

The criteria evaluated may be a measurement of a specific resource, or a resource intended for a specific transmission type. The reader may evaluate the energy, the power spectral density, or the activity in one or more specific resources. This may comprise an RSSI measurement and/or PSD measurement taken over the resource(s). The measurement evaluated may comprise a signal energy, or average signal energy, in a specific resource, or set of resources, and may be intended for reception of a known message (e.g., a resource dedicated for MSG1, a resource dedicated for MSG3, a resource associated with unicast device transmission, or a set of resources configured by the network). Such measurement may be taken over one inventory procedure, over multiple inventory procedures, or over a period of time. The measurement evaluated may comprise a difference of, or change in, signal energy between two successive resource types (e.g., MSG1 resource and MSG3 resource). The measurement evaluated may comprise a difference of, or change in, signal energy between successive resources of the same/different types in different inventories (e.g., difference in MSG1 energy between successive inventories). The measurement evaluated may comprise a difference of, or change in, signal energy between resources, and may be of the same or different type, having a transmission (e.g., a MSG1 resource where at least one device has transmitted MSG1) in it compared to having no transmission (e.g., a MSG1 resource where no devices transmitting MSG1 are detected).

The criteria evaluated may be a measurement of a number of devices. The reader may evaluate the number of devices which meet a specific criteria. The reader may trigger a measurement if the number of devices that meet the specific criteria is above or below a threshold value.

The criteria for a measurement of a number of devices may be a measurement related criteria. For example, the reader may determine the number of devices (e.g., the number of devices responding to an inventory) having a measurement (e.g., any measurement described above) meeting a specific measurement related condition (e.g., above/below an RSSI threshold value). For example, the reader may determine the number of devices having a measurement that changes (e.g. from one resource to another, from one occasion to another, from one message to another, or from one inventory to another) by at least a threshold value.

The criteria for a measurement of a number of devices may be a duration-related criteria. For example, the reader may determine the number of devices having a transmission duration meeting a specific condition (e.g. above/below a length or transmitting outside a slot boundary).

The criteria for a measurement of a number of devices may be a pre/mid/post-amble-related criteria. For example, the reader may determine the number of devices having a transmission which includes at least a mid-amble.

The criteria for a measurement of a number of devices may be a response-related criteria. For example, the reader may determine the number of devices responding to an inventory procedure (e.g., transmitting MSG3 or transmitting MSG1). For example, the reader may determine the difference in the number of devices responding to an inventory between a first inventory and a second inventory, or between a first set of resources and a second set of resources.

The criteria for a measurement of a number of devices may be a failure-related criteria. For example, the reader may determine the number of devices succeeding in random access, but for which MSG3 is not correctly decoded. For example, the reader may determine the number of devices (e.g. in a contention-free paging of a set of known devices) which fail to respond correctly, or transmit data without error.

The criteria evaluated may be a measurement of a number of operations (e.g., inventory). The reader may evaluate the number of operations (e.g., unicast transmission/receptions, commands sent, command responses received, or inventory procedures). The reader may evaluate the number of operations within a period of time, for example consecutive, for which a condition is satisfied. Such conditions may comprise (similar to above solutions): a measurement condition or criteria; a duration related condition or criteria; a response-related criteria; a pre/mid/post-amble-related criteria; and/or a failure-related criteria.

The criteria evaluated may be a measurement of a number of resources. The reader may evaluate the number of resources (e.g. of a specific type or having an expected MSG type received from a device). The reader may evaluate the number of resources within a period of time, for example consecutive, and/or within a number of occasions, or inventory procedures, whereby a condition is satisfied, whereby such condition may comprise (similar to above solutions): a measurement condition or criteria; a duration related condition or criteria; a response-related criteria; a pre/mid/post-amble-related criteria; and/or a failure-related criteria.

The criteria evaluated may be a measurement of a time or a time difference. The reader may evaluate a time duration of an event, or a time difference between two events, where an event may be related to (similar to above solutions): a measurement condition or criteria (e.g. a time period during which a measurement condition is satisfied is above/below a threshold value and/or a time difference between two measurement related conditions is above/below a threshold value; a response-related criteria (e.g. a time period required for a response to be received by a reader is above/below a threshold value and/or a time difference between responses, possibly associated to one or more devices, is above a threshold value); a pre/mid/post-amble-related criteria; and/or a failure-related criteria.

Measurements configured at the reader may be limited to specific operations only, where an operation may relate to a characteristic of, for example, an inventory, a command, or an inventory+command, or the parameters used to trigger such procedure. For example, a measurement may be configured/evaluated only for inventory procedures where all devices are triggers. For example, a measurement may be configured/evaluated only for inventory procedures where at least X devices respond, or where at least Y devices are included in a paging ID. For example, a measurement may be configured/evaluated only for an inventory procedure which is immediately followed by a command, possibly for a minimum number of devices.

Measurement-triggered reports may be used by the network to determine whether the number of resources used for an inventory are sufficient, and therefore to know whether to reconfigure the number of resources. Similarly, measurement-triggered reports may be used by the network to determine whether the size of a preamble or random sequence is sufficiently large and whether to reconfigure these. Also, measurement-triggered reports may be used to detect a change of the appropriate reader to be used for a specific device (i.e., in device selection).

In an example, a WTRU may trigger a report when the difference in energy (e.g., RSSI) measured between a particular resource associated with MSG1 reception, and a particular resource associated with MSG3 reception, or any resource for dedicated device transmission, is larger than a threshold value.

In an example, a WTRU may trigger a report when an average energy (e.g., RSSI) measured in resources allocated for MSG1 transmission over multiple inventory procedures is above a threshold value.

In an example, a WTRU may trigger a report when a change in a device transmission power measured over two successive (e.g. consecutive) inventory procedures is larger than a threshold value, where the event may be configured for a specific device or for any device.

In an example, a WTRU may trigger a report when a number of devices for which the transmit power/energy between successive (e.g. consecutive) inventory procedures has changed by at least a threshold value.

In an example, a WTRU may trigger a report if a time between successive inventory procedures is above a threshold value. Otherwise, the WTRU may trigger a report with a specific time period.

In an example, a WTRU may trigger a report if it receives a response (e.g., MSG3) from a device which is not currently on a list configured at the WTRU by the network or maintained by the WTRU.

A WTRU may determine whether to trigger an inventory procedure. A WTRU may be configured with events (e.g. similar to events as for reporting) which may trigger the initiation of an inventory procedure. For example, the mobility of a WTRU may be used as a trigger for an inventory procedure. Such events may be related to the results of a previous inventory procedure. For example, a WTRU may trigger an inventory procedure at or for a specific time (e.g., within a first time period of a previous inventory procedure) based on conditions described herein (e.g. conditions for triggering a report) being met in the previous inventory procedure period. For example, based on the results of an inventory procedure, the WTRU may determine whether to trigger a subsequent inventory procedure immediately, prior to some predefined default time, at a targeted time, or with a shorter time period (e.g. compared to a default or configured time period). Any of the events associated with WTRU for reporting may be used as triggers for an inventory period, without loss of generality.

A WTRU may determine whether to include an information element with a report. The WTRU may be configured with events (similar to those above as for reporting) which may trigger the inclusion of one or more information elements within a report. For example, the WTRU may be configured with periodic reports, and may include an information element within the report based on the evaluation of a criteria or conditions described herein. Information elements may include but are not limited to a measurement, an identity, a specific resource, a quantity in a D2R message received by a device, or a number of devices. In an example, a WTRU may report the contents of an inventory procedure (e.g., the contents of MSG3 from each of the devices that responded during the inventory). The WTRU may be configured to include the measured energy received from a specific device transmission, or the measurements of a list of devices, along with the inventory results based on any measurement related trigger described herein.

Avoiding redundant device transmissions, due to, for example, multiple readers transmitting the same inventory procedure initiated by the network, may be achieved by a selection process. For example, a device may select the reader and/or inventory procedure to respond to. For example, a device may select a reader and respond only to inventory procedures triggered by that reader. Alternatively or in addition, the network or the reader may select the devices that a specific reader initiates transmission to.

Figure 8:
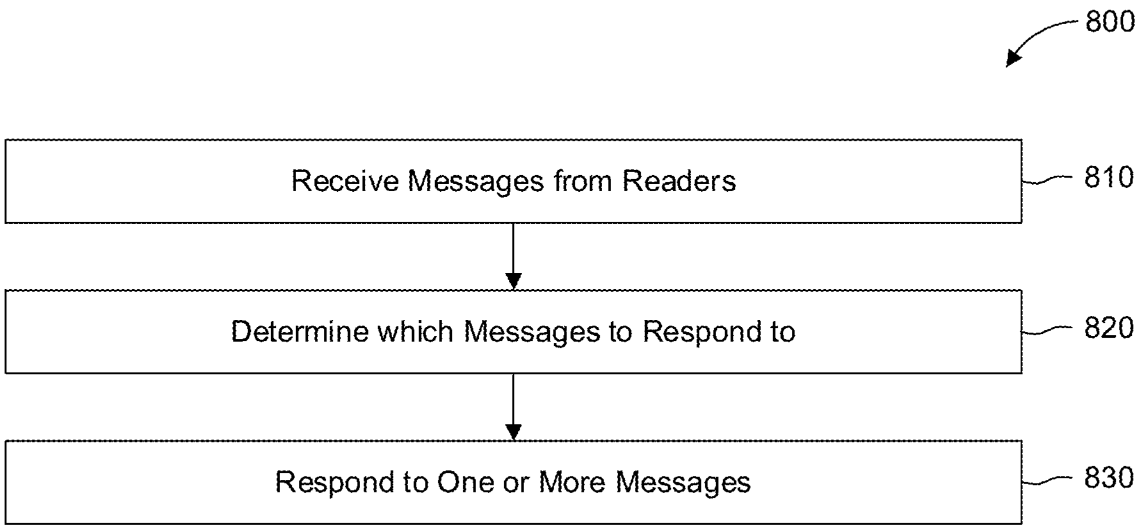
FIG. 8 show an example method for a device to select a procedure for responding.

A device (e.g. an AIOT device) may select a subset of triggered inventory procedures or command procedures to respond to. FIG. 8 shows an example method 800 for a device to select a procedure to respond to. A device may receive a message 810 from one or more readers (e.g. WTRUs). The message may be a paging message for an inventory procedure. The message may be a command message. The device may select or determine which inventory procedure (e.g., triggered by the paging message) to respond to 820 (i.e. which reader(s) to respond to). For example, the device may receive multiple paging messages. Each paging message may indicate that the device should respond (e.g., based on its device ID). The paging messages may be from the same or different readers. The reader may respond (e.g. only respond) to a subset of the messages 830. For example the device may attempt a random access procedure. Herein, a response may comprise performing a random access procedure, as defined herein. A response may comprise transmitting data (e.g., for contention-free access).

The device may determine which triggered inventory procedure to respond to based on one or a combination of the following factors.

The device may determine which triggered inventory procedure to respond to based on a time or time difference. For example, a device may respond to a first paging message. Following the response, the device may abstain from responding to another paging message until a configured or predefined period of time has elapsed. The device may abstain from responding to another paging message from the same reader until a configured or predefined period of time has elapsed. The device may abstain from responding to another paging message from a different reader until a configured or predefined period of time has elapsed. For example, a device may respond to a configured minimum/maximum paging messages within a configured time period.

The device may determine which triggered inventory procedure to respond to based on a stored energy of the device. For example, a device may respond to a paging message as long as the stored energy is above a threshold value. Stored energy may be measured as an absolute amount of energy (e.g., in joules). Stored energy may be measured by the amount of time remaining in the reliable device transmission (e.g. a device may transmit under normal conditions given it has enough stored energy to do so). For example, the device may respond only if the device energy is such that the remaining device operating time is above a threshold value. Such threshold may further be a function of the properties of the inventory procedure (e.g., a factor such as number of occasions which may influence the duration of the inventory).

The device may determine which triggered inventory procedure to respond to based on a received power. For example, a device may respond to a paging message based on the measured energy of the paging message, the carrier wave used for backscattering, or a combination of the two. For example, a device may respond to a paging message if the backscattering signal power is above a first threshold value, and the paging message received power is above a second threshold value.

The device may determine which triggered inventory procedure to respond to based on a reader/session identity. For example, a reader may transmit a reader identity (e.g., in the paging message). Such reader identity may be assigned to the reader by the network, or may be selected randomly by the reader. For example, a device may not respond to a second paging message if it previously responded to a first paging message where the two messages included the same reader identity. For example, if the device responds to a first paging message including a specific reader identity, it may only respond to subsequent paging messages when they are transmitted from the same reader identity. For example, in a period of time x, the reader may only respond to messages having a single reader identity. For example, a reader may transmit a session identity (e.g., in the paging message). For example, a reader may increment each session identity for each different inventory request received from the network. For example, a reader may increment each session identity for each inventory request comprising a change of at least one device identity. The device may not respond to a second paging message if it previously responded to a first paging message where the two paging messages included the same reader identity.

The device may determine which triggered inventory procedure to respond to based on a successful random access procedure. For example, a device may determine whether to respond to multiple paging messages which occur less than a threshold time from each other based on whether the device succeeds in a random access. For example, if the device succeeds in a random access, it may not respond to a subsequent random access. The device may not response to a subsequent random access for a defined period of time. The device may not response to a subsequent random access until it has no stored energy or carrier wave signal.

The device may determine which triggered inventory procedure to respond to based on a paging or response resource. For example, a device may respond to a paging message based on the number of resources configured for responses. For example, a device may respond to a paging message as long as the number of resources configured for a response is larger than a threshold value. For example, a device may respond to a paging message following a failed random access procedure in a first inventory round, only if the number of resources configured for the second inventory round is larger (e.g. by at least a threshold value) than the number of resources configured for the first inventory round. For example, a device which responds (e.g. successfully) to a first paging message may not respond to a second paging message having the same (or within a configured threshold) number of response resources as was configured in the first paging message. For example, a device may respond to a paging message based on a specific relationship between the paging resource and/or one or more of the response resources. For example, a device may only respond to paging messages that have the same timing relationship between the paging resource and/or one or more response resources as the relationship associated with the last successful random access procedure.

The embodiments described above may depend on knowledge/identification of the reader by the device. Explicit identification may comprise the reader sending a unique identity. However, implicit identification may be preferred as such explicit signaling may not be needed. More generally, a device may determine any behavior which depends on the reader based on this implicit knowledge. The implicit knowledge may comprise transmitting the same/similar configuration information. One aspect of configuration information may comprise a pattern, amount, relative time/frequency separation, or hopping patter of the resources configured to the device for initial access. Based on knowledge of the reader, the device may determine whether to respond to paging, whether to include information (e.g. new information) in the D2R messages during/after the random access.

Figure 9:
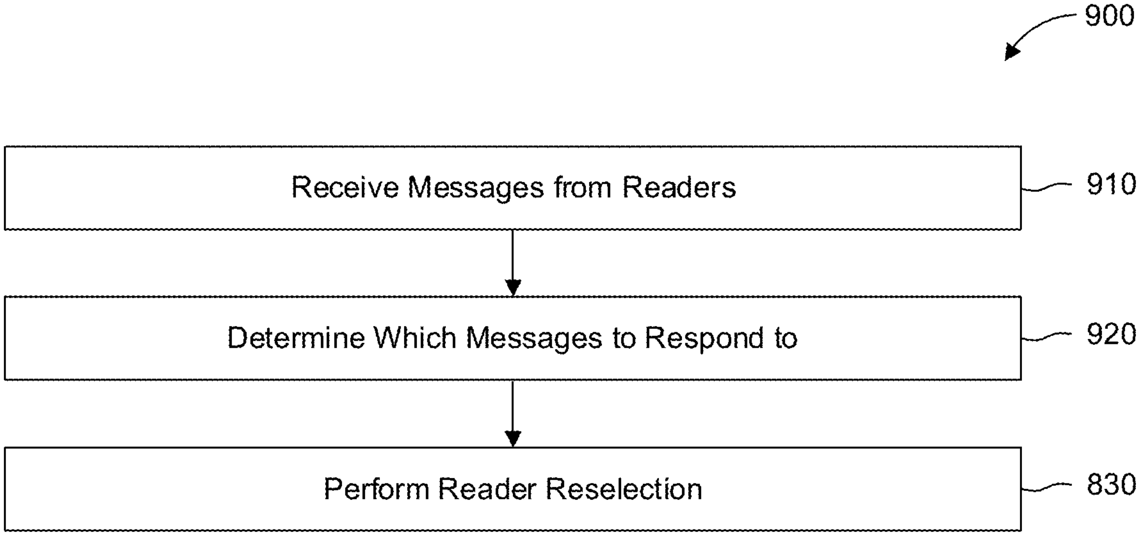
FIG. 9 shows an example method for reader reselection.

A device (e.g. an AIOT device) may perform reader reselection based on specific triggers. FIG. 9 shows an example method for reader reselection. A device may receive a message 910 from one or more readers (e.g. WTRUs). The message may be a paging message for an inventory procedure. The message may be a command message. A device may perform reader selection 920, for example, as described above in relation to FIG. 8. For example, the device may select or determine which inventory procedure (e.g., triggered by the paging message) to respond to (e.g. which reader(s) to respond to). For example, the device may receive multiple paging messages. Each paging message may indicate that the device should respond (e.g., based on its device ID). The paging messages may be from the same or different readers. The device may determine or select which triggered inventory procedure to respond to based on one or a combination of the factors discussed above in relation to FIG. 8. The device may be triggered to perform reader reselection 930 (i.e., initiate a new decision or determination of a new reader that the device should respond to, where the decision may be based embodiments described above). A current reader may be the reader that the device decides to respond to (e.g. in response to a paging message). The device may trigger a reselection based on one or more or a combination of the following triggers.

The device may trigger a reader reselection based on a reader signal quality. For example, a device may trigger reader reselection when the signal quality of the current reader falls below a threshold value, or below the signal quality of another reader, for example, by at least a threshold value.

The device may trigger a reader reselection based on lack of reception of a paging message (e.g., for a period of time). For example, a device may trigger reader reselection when the device has not received a paging message from the previously selected reader for a (pre) configured period of time.

The device may trigger a reader reselection based on reception of a paging message from a different reader than the previously selected reader. For example, a device may trigger reader reselection if it receives a paging message from a different reader other than the reader that it had previously selected.

The device may trigger a reader reselection based on successful random access to another reader. For example, a device may trigger reader reselection following successful random access to a reader that is different than the previously selected reader.

The device may trigger a reader reselection based on explicit indication by a reader. For example, a device may trigger reader reselection if it receives an explicit indication (e.g., in a paging message) that indicates to perform reader reselection.

A WTRU may use a list of devices provided by the network for paging devices. In an embodiment for reducing redundant device transmissions, the network may provide a WTRU with a list of associated devices. For example, the WTRU may receive (e.g. in dedicated RRC signaling) a list of device identities (IDs). The device identities may be a set of upper layer (e.g. application layer, core network (CN) layer) identities, or a set of access stratum (AS) layer (e.g., assigned by the network) device identities. For example, in the case of a AS layer device identities, the WTRU may further maintain an association of upper layer device IDs with AS device IDs.

Figure 10:
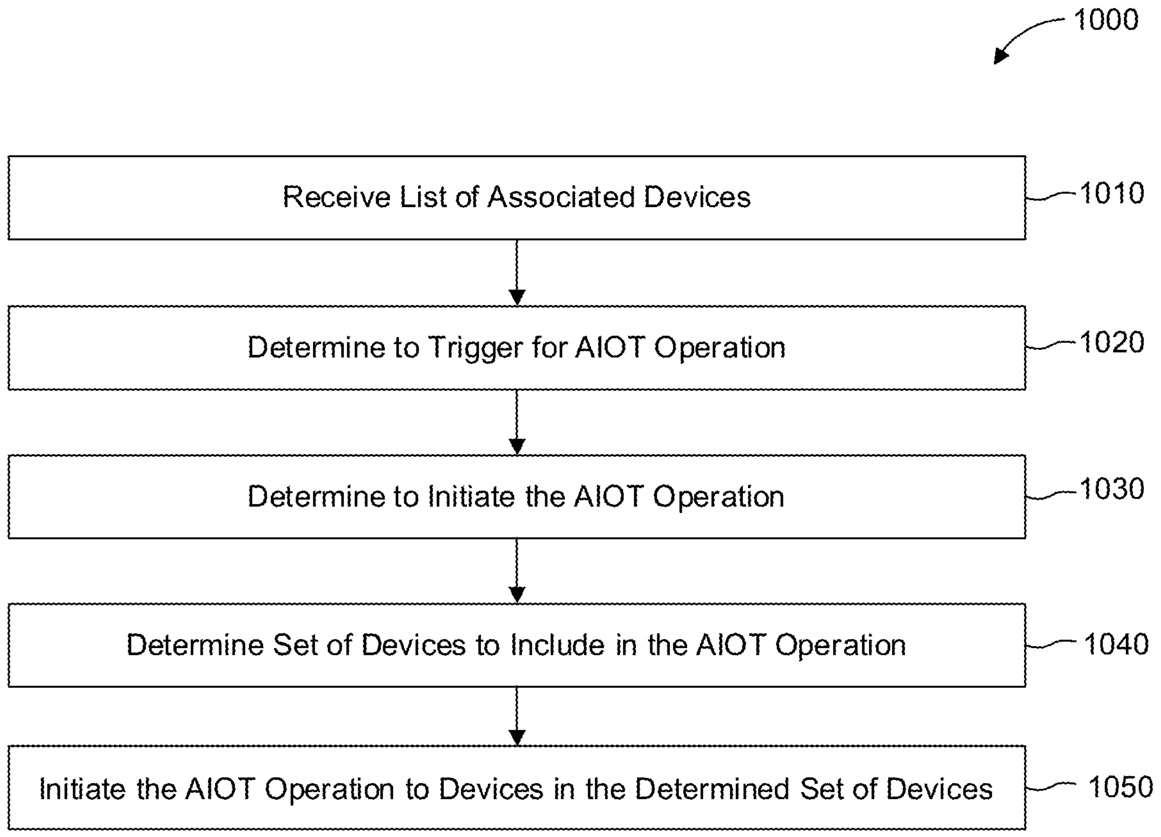
FIG. 10 shows an example method for performing an AIOT operation based on an associated device list.

FIG. 10 shows an example method 1000 for performing an AIOT operation based on an associated device list. A WTRU (e.g. a reader) may receive information indicating associated devices (e.g. AIOT devices) 1010. The information may be a list (e.g. first list) of associated devices. The information may indicate device identities. The first list may indicate device identities of devices that are associated with the WTRU (e.g. an associated device list). The WTRU may receive the first list from a network node (e.g. gNB). The WTRU may receive the first list via, for example RRC signaling. The device identities may be a set of upper layer (e.g. application layer, core network (CN) layer) identities, or a set of access stratum (AS) layer (e.g., assigned by the network) device identities. For example, in the case of a AS layer device identities, the WTRU may further maintain an association of upper layer device IDs with AS device IDs.

The WTRU may determine whether to trigger an AIOT operation 1020. The WTRU may receive trigger information for performing an AIOT operation. The WTRU may receive the trigger information from a core network (CN) node (e.g. an AMF). The WTRU may receive the trigger information from an upper layer. The trigger information may comprise a list of device identities (e.g. a second list) for performing the AIOT operation. The WTRU may determine whether to trigger the AIOT operation based on the received trigger information. The AIOT operation may be an inventory operation (e.g. paging message). The AIOT operation may be a command operation. The WTRU may determine whether to trigger an AIOT operation based on triggers discussed above relating to AIOT operation (e.g. inventory procedure) or reporting triggers. For example, the WTRU may determine to trigger an AIOT operation based on WTRU mobility. The WTRU may trigger an AIOT operation at a specific time based on a trigger condition being met in a previous inventory procedure period. For example, based on the results of an inventory procedure, the WTRU may determine whether to trigger a subsequent inventory procedure immediately, prior to some predefined default time, at a targeted time, or with a shorter time period, as compared to a default or configured time period.

The WTRU may determine a set of devices to include in the triggered AIOT operation 1030. For example, the WTRU may determine a set of devices to include in a paging message or determine the set of devices to send paging messages. The WTRU may determine the set of devices based on the first list and the second list. For example, the WTRU may include, in the AIOT paging message, only the devices that are in both the first and second list. That is, the AIOT operation will be directed to an associated device.

The WTRU may initiate the AIOT operation to the devices in the determined set of devices 1040. The WTRU may determine to initiate the AIOT operation based on the first list and the second list. For example, if at least one of the devices identified in the second list is included in the first list (i.e., associated device list), the WTRU may determine to initiate the AIOT procedure. For example, the WTRU may transmit a paging message for an inventory procedure to each of devices in the determine set of devices. For example, the WTRU may send a command message to each of the devices in the determines set of devices.

A WTRU may trigger/send measurements to the network in support of the device list. In support of maintenance, by the network, of the second device list, a WTRU may send reports/measurements to the network. Such reports/measurements may be sent along with the results of the inventory procedure that is used to generate the measurements (e.g., in a same message, such as an RRC message). The WTRU may send the reports and the measurements in separate messages (e.g. in the same or different Uu transmissions). For example, the inventory results may be sent in a data message or a NAS message, or in a data bearer transmission. The measurements may be sent in an UL RRC message.

A WTRU may determine whether to transmit a report (e.g., the RRC message) The WTRU may determine whether to transmit a report at the end of a completed AIOT procedure (e.g., inventory procedure) based on conditions described herein. The WTRU may determine whether to include a measurement or information element, as described herein, in the report (e.g., the RRC message) based on conditions described herein.

Figure 11:
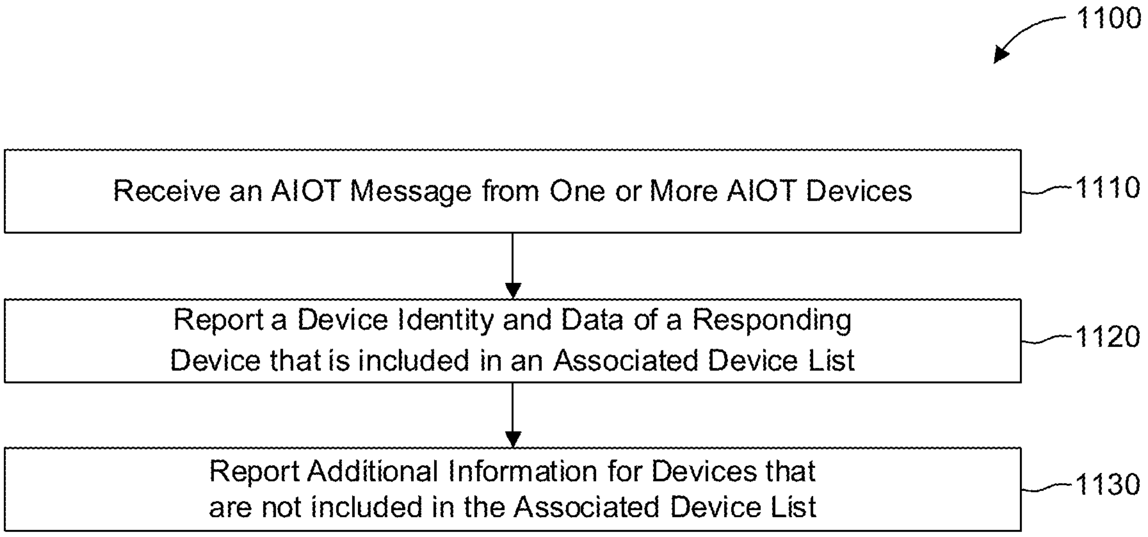
FIG. 11 shows an example method for reporting measurements and/or results.

FIG. 11 shows an example method 1100 for reporting measurements and/or results. The method of FIG. 11 may be performed in additional to, in conjunction with, or alternatively to the method of FIG. 10. A WTRU may receive, from one or more AIOT devices (e.g. responding AIOT devices), an AIOT message or signal 1110. The message may be, for example, a response to an inventory procedure or page (e.g. an inventory response). The message may be, for example, a response to a command (e.g. a command acknowledgement). The message may be received in a configured set of AIOT resources (e.g. time and/or frequency resources).

The WTRU may send or report information (e.g. a device identity (ID) and/or data/measurements) of a (e.g. each) responding device, where the responding device is included in an associated device list 1120. The data may be measurement results. Measurement results may include the measured power or signal strength of the device transmission, and the device ID and/or timing of the received device transmission may be included. The report may be sent to a network node (e.g. gNB). The report may be sent over a Uu interface. The associated device list may comprise device identities. The device identities may indicate devices that are associated with the WTRU and may be referred to as associated devices. The WTRU may receive the associated device list from a network node (e.g. gNB). The WTRU may receive the associated device list via, for example, RRC signaling. The device identities may be a set of upper layer (e.g. application layer, core network (CN) layer) identities, or a set of access stratum (AS) layer (e.g., assigned by the network) device identities. For example, in the case of a AS layer device identities, the WTRU may further maintain an association of upper layer device IDs with AS device IDs. The WTRU may determine the devices in the associated device list. The WTRU may send a list of devices (e.g. a list of AS device IDs or CN device IDs) that responded to the WTRU (e.g., in the last inventory procedure or in the last X inventory procedures). The WTRU may send the list of devices to the gNB. The WTRU may include only the devices which responded to the WTRU, and which are also an associated device (e.g. included in the gNB provided or WTRU determined associated device list). The WTRU may send or include this information, for example, at the end of an inventory procedure.

The WTRU may send or report additional information 1130 (e.g. information of non-associated devices). A non-associated device may be a responding device that has a device identity that is not in the associated device list (i.e. its device identity is not in the associated device list). The additional information may be sent in a same report or message as the device identity and/or data/measurements of an associated device 1120. The additional information may be sent in a different report or message as the device identity and/or data/measurements of an associated device 1120. The additional information may be a device identity. The additional information may be measurement results (e.g. a measured quality of power of the device transmission) of the non-associated devices responding to, for example, an inventory procedure or page. The additional information may be a signal strength of associated devices. The additional information may be a signal strength measurement of associated and non-associated devices.

The WTRU may determine whether to include the additional information based on an identity of the responding device transmitting the message or signal, for example in comparison to the associated device list.

Additionally or alternatively, the WTRU may determine whether to include additional information (e.g. a device identity of a responding device and data (e.g. measurement results)) for a non-associated device based on a WTRU location or a change of location (e.g. location of the WTRU as compared to a location of the WTRU of a last reporting event). For example, the WTRU may include a device identity of a responding non-associated device and data (e.g. measurement results) for that device if the WTRU experienced a mobility condition or based on a mobility rule since the last time an inventory was triggered or a report was made. A mobility condition or rule may be, for example, different cell, a different tracking area, or a different GPS location. For example, the WTRU may include the device identity and data of a non-associated device if the WTRU has moved to a different cell, a different tracking area, or a different GPS location since the time the WTRU last send a report (e.g. Uu report) to the network (e.g. gNB). For example the WTRU may include the device identity and data of a non-associated device if the WTRU has moved by a predetermined amount since the time the WTRU last send a report (e.g. Uu report) to the network (e.g. gNB). Otherwise, the WTRU may send a report for the associated devices only.

Additionally or alternatively, the WTRU may determine whether to include additional information (e.g. a device identity of a responding device and data (e.g. measurement results) for a non-associated device based on a measurement (e.g. signal strength) of an AIOT transmission of the non-associated device compared to a measurement of a previous transmission of the non-associated device. For example, if the AIOT transmission by that non-associated device has a measured signal power/quality that is above a threshold value, the WTRU may include the device identity and data/measurements of the non-associated device. In an example, a WTRU may include measurement results of the associated and/or non-associated devices depending on the measurement results since the last report or the last inventory procedure. For example, if the WTRU receives an inventory response from a non-associated device having a signal strength that has increased by at least a threshold amount since the last received device transmission (e.g. since the last inventory response), the WTRU may include the device identity and/or data/measurements of that non-associated device in the report, otherwise, the WTRU may include only information of the associated devices.

A WTRU may perform device selection autonomously based on inventory results. In an embodiment for reducing redundant device transmissions, the WTRU may perform device selection based on the results of the inventory procedure. For example, the WTRU may determine the associated list of devices on its own (e.g. for performing filtering of a CN triggered AIOT operation). The WTRU may report the selected or determined list periodically, whenever the WTRU moves to connected mode, or based on any other trigger as described herein.

A WTRU may perform device selection based on any or a combination of the following criteria.

A WTRU may perform device selection based on measurements of device transmissions during an operation on the AIOT interface (e.g. inventory or command procedure). For example, the WTRU may add/remove a device from the associated list based on a measured power/energy of the device transmissions.

A WTRU may perform device selection based on a size of the associated device list. For example, the WTRU may be configured to maintain a configured device list size, or maintain the device list to a maximum configured size. For example, the WTRU may select a maximum of X devices (e.g., devices with the largest measured power/energy).

A WTRU may perform device selection based on a successful response from a device during an AIOT procedure (e.g., inventory procedure). For example, the WTRU may be configured with conditions to add/remove a device from the associated list based on whether a device responds to an inventory procedure. For example, a device may be removed from the list in the absence of a response from the device (i.e., the device does not send MSG3) in X, possibly consecutive, number of inventory procedures. For example, a device may be added to the associated if the device responds in X consecutive inventory procedures.

A WTRU may report (e.g. a change in) the associated list to the network (e.g., in an RRC message). The WTRU may report the change when the associated list changes. The WTRU may report the change when the associated list changes by at least a number of configured devices since the last time the report was triggered. The WTRU may report the change after each X number of inventory procedures, or procedures on the AIOT interface. The WTRU may report the change following a request from the network. The WTRU may report the change following a (e.g. each) transition to an RRC connected state. While in an RRC connected state, the WTRU may be configured with other conditions (e.g., a periodic timer) for reporting the new associated list. The WTRU may report the change after a WTRU mobility event.

Without loss of generality, all conditions described herein for triggering a report may be used as triggers for reporting the latest associated list to the network. The report of the associated list may also include other information (e.g., measurement reports). The report of the associated list may also include an association between an AS device ID with an upper layer ID.

In an example, a WTRU may perform device reselection periodically (e.g., after the expiration of a timer). The WTRU may evaluate the conditions for inclusion of devices into the associated device list, and may send the associated device list to the network.

In an example, a WTRU may send the change in the associated device list in delta signaling. For example, only the change in a previously reported quantity or configuration is sent and anything that is unchanged is not reported. For example, the WTRU may provide the devices to be added to the list. For example, the WTRU may provide the devices to be removed from the list, with an indication that they should be removed. The WTRU may send a measurement report (e.g., the measured signal power) only of the devices whose measured transmission power/energy has changed by at least a delta amount (e.g., configured by the network).

A WTRU may use the associated device list to reduce device transmissions. The WTRU may use the associated list (e.g., the list of devices provided by the network or determined by the WTRU) to filter devices associated with an inventory request received from the core network. For example, the WTRU may receive a request to perform an AIOT operation from the core network (e.g., an inventory request). The WTRU may receive such request via, for example, CN initiated paging or NAS signaling. The request may come from the upper layers in the WTRU. The WTRU may receive, in such a request, a set of device IDs (e.g., CN device IDs) or a paging identity that provides a format/mask/list of IDs that correspond to the devices to be paged.

The WTRU may generate one or more paging messages (e.g., initiate an AIOT interface operation, such as inventory or command) from the received CN request by selecting only the IDs in the CN request which are also included in the associated device list. The WTRU may receive a first list of device IDs from the network (e.g., the CN, the upper layers, or in NAS signaling) and may receive a second list of device IDs from the network (e.g., the gNB), which may be considered the associated device list. Upon reception of a request for an AIOT operation, which may be received along with the first list, the WTRU may trigger one or more AIOT operations on the AIOT interface (e.g., inventory or command). The WTRU may use, in the initial trigger message (e.g., the AIOT paging message) sent to the devices, a list of IDs which include those IDs which are included in the first list and also the second list. For example, the WTRU may divide the operation indicated by the CN into multiple operations (e.g. each with a subset of the IDs) where only the devices which reside in both the first list and the second list are included in any of the operations.

A WTRU may perform an operation such as an ID filtering operation on IDs received from the CN only for a subset of operations. The WTRU may include only those IDs which it is configured to interact with.

In an example, the WTRU may perform filtering on the gNB provided list only for an operation received from the core network that corresponds to an inventory+command message. Otherwise, the WTRU may trigger the operation on the AIOT interface with one or more trigger messages (e.g., paging) that include(s) all of the IDs from the CN message.

In an example, the WTRU may perform filtering on the gNB provided list only if explicitly instructed by the CN message.

In an example, the WTRU may perform filtering on the gNB provided list for a WTRU selected and/or configured subset of CN trigger operations (e.g., every other operation or every X operations).

In an example, a WTRU may use the associated device list to determine the list of devices to include in the paging message, possibly for certain operations, possibly when there is no set of devices provided by the network. For example, the network may trigger an inventory procedure (e.g., periodically) to perform localization of devices with respect to their readers. In such a case, a reader may receive an inventory request from the network without a set of devices (e.g., which may indicate to page all devices). The WTRU may trigger an AIOT procedure (e.g., inventory, transmission of MSG1 only) by including only the devices in the associated device list in the initial trigger message on the AIOT interface (e.g., the paging message).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by a wireless transmit/receive unit (WTRU), the method comprising:

receiving, from one or more responding ambient internet of things (AIOT) devices, an AIOT message;

reporting, to a network node, a device identity and data from the AIOT message of the one or more responding AIOT devices that are in an associated device list, wherein the associated device list indicates AIOT devices that are associated with the WTRU; and reporting, to the network node, additional information that includes information of a non-associated AIOT device, wherein a non-associated AIOT device is a responding AIOT device that is not in the associated device list, wherein the additional information is reported based on a change in a location of the WTRU or a quality of a transmission of the responding non-associated AIOT device.

2. The method of claim 1, wherein the additional information comprises a device identity of the responding non-associated AIOT device and a signal strength measurement of the responding non-associated AIOT device.

3. The method of claim 1, wherein the additional information is reported on a condition that a WTRU location has changed by a predetermined amount or based on a mobility condition.

4. The method of claim 3, wherein the mobility condition is at least one of: a different cell, a different tracking area, or a different GPS location.

5. The method of claim 1, wherein the additional information is reported on a condition that a signal strength of the responding non-associated AIOT device has changed by a threshold amount since a last message was received from the responding non-associated AIOT device.

6. The method of claim 1, wherein the reporting a device identity and data of the one or more responding AIOT devices that are in an associated device list is based on a reporting trigger.

7. The method of claim 6, wherein the reporting trigger is at least one of: a measurement of a quality of a responding AIOT device transmission; a measurement of a specific resource; a measurement of a number of responding AIOT devices; a measurement of a number of operations; a measurement of a number of resources; a measurement of time; or a measurement of a time difference.

8. The method of claim 1, further comprising receiving reporting configuration information.

9. The method of claim 1, wherein the associated device list is received from a gNB.

10. The method of claim 1, wherein the WTRU is a reader.

11. A wireless transmit/receive unit (WTRU) comprising:

a receiver;

a transmitter; and a processor, wherein:

the receiver is configured to receive, from one or more responding ambient internet of things (AIOT) devices, an AIOT message;

the processor and the transmitter are configured to report, to a network node, a device identity and data from the AIOT message of the one or more responding AIOT devices that are in an associated device list, wherein the associated device list indicates AIOT devices that are associated with the WTRU; and the processor and the transmitter are further configured to report, to the network node, additional information that includes information of a non-associated AIOT device, wherein a non-associated AIOT device is a responding AIOT device that is not in the associated device list, wherein the additional information is reported based on a change in a location of the WTRU or a quality of a transmission of the responding non-associated AIOT device.

12. The WTRU of claim 11, wherein the additional information comprises a device identity of the responding non-associated AIOT device and a signal strength measurement of the responding non-associated AIOT device.

13. The WTRU of claim 11, wherein the additional information is reported on a condition that a WTRU location has changed by a predetermined amount or based on a mobility condition.

14. The WTRU of claim 13, wherein the mobility condition is at least one of: a different cell, a different tracking area, or a different GPS location.

15. The WTRU of claim 11, wherein the additional information is reported on a condition that a signal strength of the responding non-associated AIOT device has changed by a threshold amount since a last message was received from the responding non-associated AIOT device.

16. The WTRU of claim 11, wherein the reporting a device identity and data of the one or more responding AIOT devices that are in an associated device list is based on a reporting trigger.

17. The WTRU of claim 16, wherein the reporting trigger is at least one of: a measurement of a quality of a responding AIOT device transmission; a measurement of a specific resource; a measurement of a number of responding AIOT devices; a measurement of a number of operations; a measurement of a number of resources; a measurement of time; or a measurement of a time difference.

18. The WTRU of claim 11, wherein the receiver is further configured to receive reporting configuration information.

19. The WTRU of claim 11, wherein the associated device list is received from a gNB.

20. The WTRU of claim 11, wherein the WTRU is a reader.

* * * * *